(12) United States Patent
Vetter et al.

(10) Patent No.: US 12,060,701 B2
(45) Date of Patent: Aug. 13, 2024

(54) FAUCET WITH CLEAN AND DIRTY CONTROLS

(71) Applicants: Jeffrey M. Vetter, Bakersfield, CA (US); Kenneth J. Vetter, Albany, CA (US); Stephen K. Vetter, Herndon, VA (US)

(72) Inventors: Jeffrey M. Vetter, Bakersfield, CA (US); Kenneth J. Vetter, Albany, CA (US); Stephen K. Vetter, Herndon, VA (US)

( * ) Notice: Subject to any disclaimer, the term of this patent is extended or adjusted under 35 U.S.C. 154(b) by 0 days.

(21) Appl. No.: 17/873,659

(22) Filed: Jul. 26, 2022

(65) Prior Publication Data

US 2023/0030828 A1 Feb. 2, 2023

Related U.S. Application Data

(60) Provisional application No. 63/225,736, filed on Jul. 26, 2021.

(51) Int. Cl.
*E03C 1/04* (2006.01)
*F16K 11/00* (2006.01)

(52) U.S. Cl.
CPC .......... *E03C 1/0412* (2013.01); *F16K 19/006* (2013.01); *Y10T 137/9464* (2015.04)

(58) Field of Classification Search
CPC . E03C 1/0412; F16K 19/006; Y10T 137/9464
USPC ........................................................ 137/801
See application file for complete search history.

(56) References Cited

U.S. PATENT DOCUMENTS

| | | | | |
|---|---|---|---|---|
| 105,254 | A | * 7/1870 | Zinkil | .................... C13B 20/06 127/50 |
| 1,512,702 | A | * 10/1924 | McCarty | ................. F16K 31/60 251/291 |
| 4,344,452 | A | * 8/1982 | Sato | ........................ F16K 31/60 239/113 |
| 4,456,222 | A | * 6/1984 | Shen | ................. F16K 31/52425 251/339 |
| 5,096,503 | A | * 3/1992 | Wellman | ................ A61B 90/70 137/625.48 |
| D512,487 | S | * 12/2005 | Kulig | ........................... D23/252 |
| 9,903,506 | B2 | * 2/2018 | Kole | ..................... F16K 31/607 |
| D818,053 | S | * 5/2018 | Liu | .............................. D21/455 |
| D910,152 | S | * 2/2021 | Kulig | ........................... D23/253 |
| 11,073,226 | B2 | * 7/2021 | Kole | ..................... F16K 31/607 |

(Continued)

*Primary Examiner* — Daphne M Barry
(74) *Attorney, Agent, or Firm* — Heisler & Associates

(57) ABSTRACT

A pair of levers are provided extending from a common junction to free tips which are spaced from each other. The junction is coupled to a valve of a faucet, with such a coupling either being direct or with intervening structures. The valve can be controlled by a user manual gripping and applying force to either the first lever or the second lever. The levers are sufficiently far apart that a user can control the valve while only touching one of the levers. The junction can be removably attachable to a control knob coupled to the valve or can be built into the faucet. The two levers are preferably elongate in form and preferably include indicia thereon indicating that one of the levers should be used first and the other of the levers should be used last. In one embodiment, the indicia include the wording "dirty" and "clean."

19 Claims, 2 Drawing Sheets

(56) References Cited

U.S. PATENT DOCUMENTS

| | | | |
|---|---|---|---|
| 2005/0087717 A1* | 4/2005 | Burke | F16K 31/52433 251/263 |
| 2010/0288365 A1 | 11/2010 | McEnaney | |
| 2016/0146373 A1* | 5/2016 | Bares | F16K 31/602 16/436 |
| 2018/0216750 A1 | 8/2018 | Kole | |
| 2019/0323613 A1* | 10/2019 | Ismert | F16K 5/0292 |

* cited by examiner

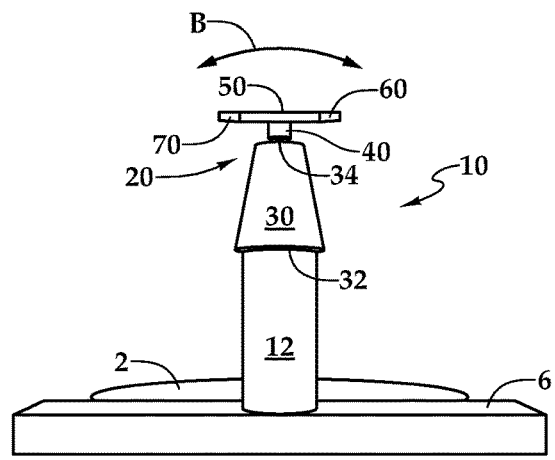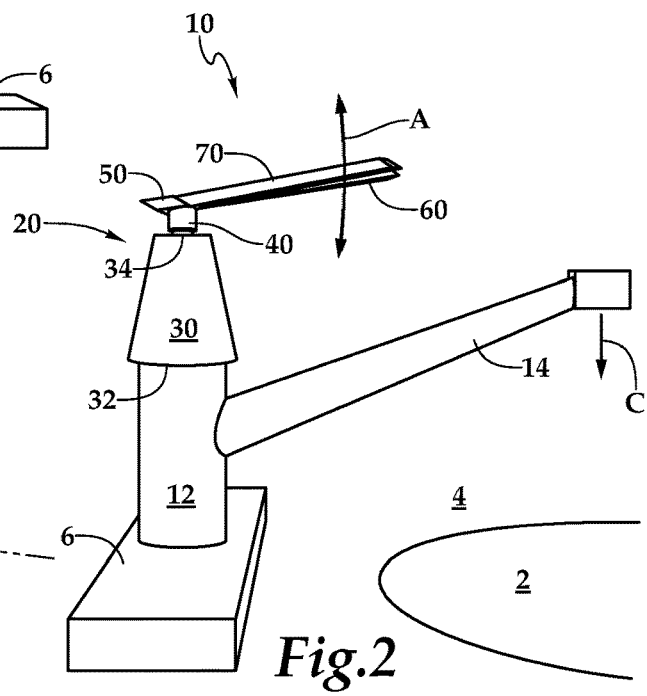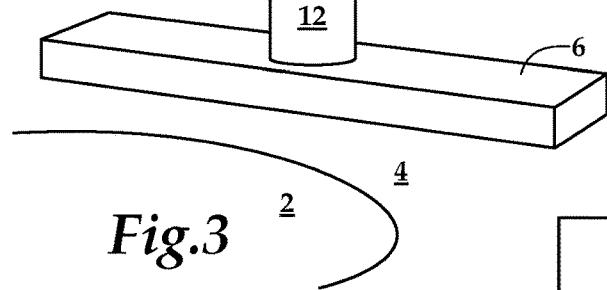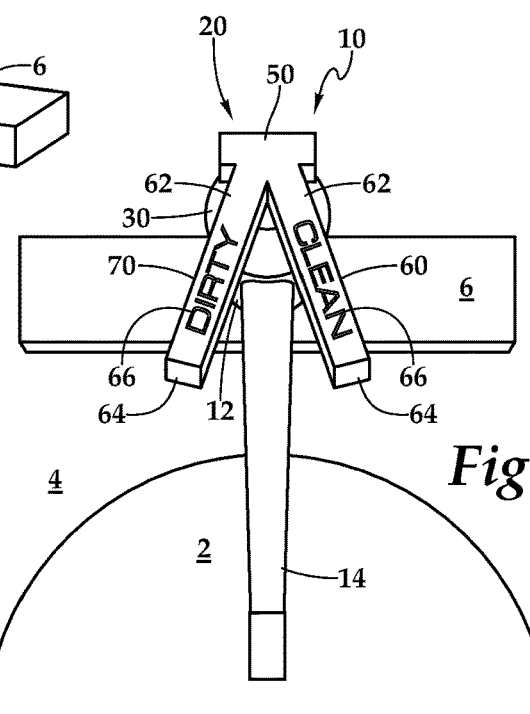

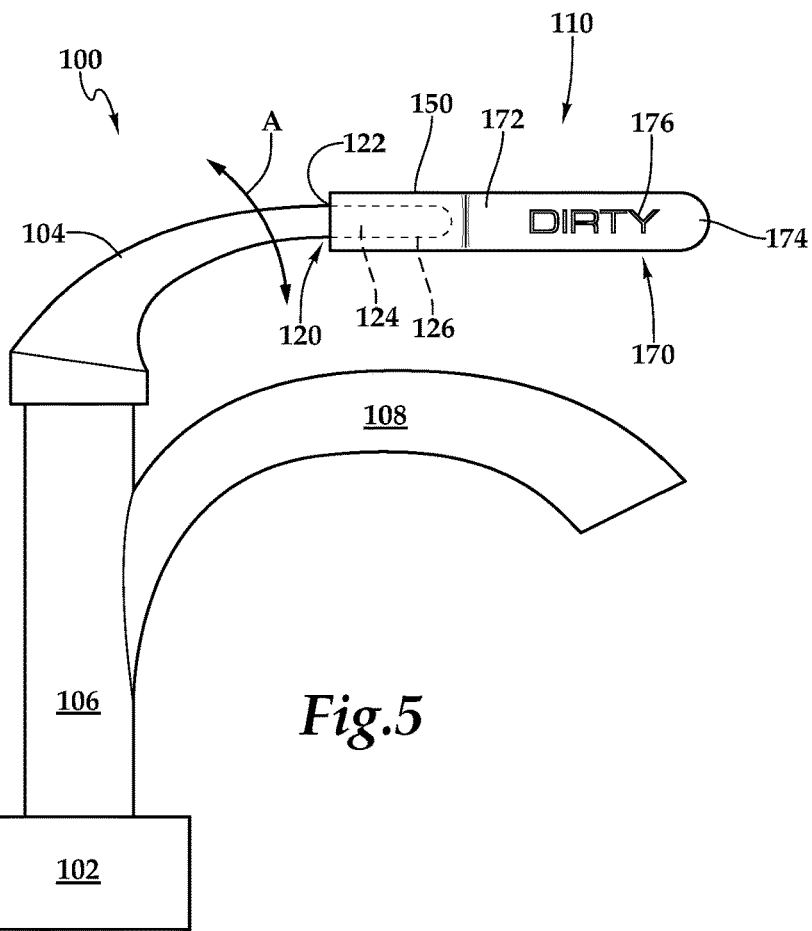
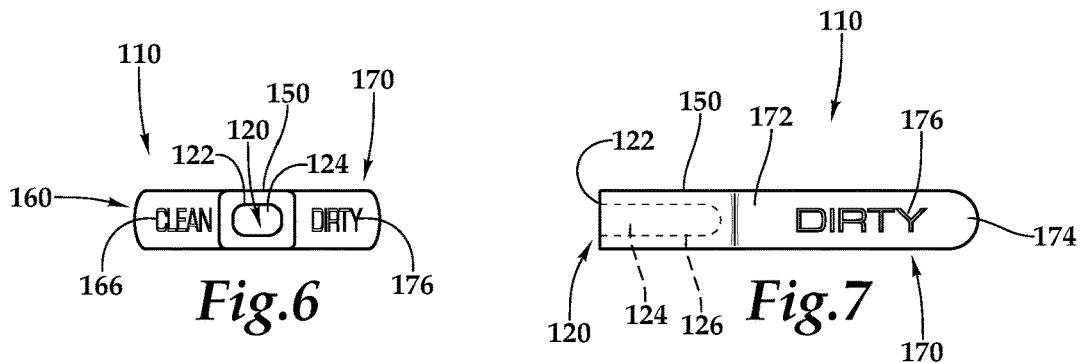
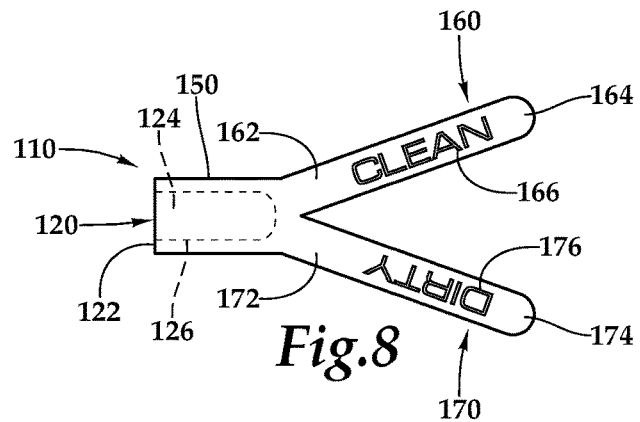

FAUCET WITH CLEAN AND DIRTY CONTROLS

CROSS-REFERENCE TO RELATED APPLICATIONS

This application claims benefit under Title 35, United States Code § 119(e) of U.S. Provisional Application No. 63/225,736 filed on Jul. 26, 2021.

FIELD OF THE INVENTION

The following invention relates to faucets which control flow and optionally also temperature of water exiting a spout or other outlet of the faucet. More particularly, this invention relates to faucets which include characteristics to minimize transfer of contaminants between users of the faucet.

BACKGROUND OF THE INVENTION

A supply of water under pressure is beneficial for a variety of different purposes. Water can be supplied indoors, typically with a drain nearby, to allow for washing of various items, and conveniently to provide water for cooking, drinking and to otherwise support activities which require a supply of water.

Hands are among items typically cleaned with water, such as in a bathroom or kitchen environment or at a cleanup station. Water is typically provided through a faucet which includes a water outlet coupled to a water supply, and supports a valve between the supply and the outlet. The valve is configured to be manually actuatable, so that the user can open and close the valve to cause water to flow or stop flowing at the manual inputs of the user.

Valves associated with faucets come in a variety of different configurations. Adjacent to some wash basins, a separate hot water faucet and cold water faucet are provided. In other installations, a single faucet is provided, but a separate hot water knob and cold water knob are provided, which knobs can be rotated or otherwise adjusted to control the rate of flow of the hot water and the rate of flow of the cold water. Many faucets have control knobs which are of a unified variety with the knob having two degrees of freedom (at least), and with one degree of freedom controlling a rate of flow and with the other degree of freedom controlling mixing of hot water and cold water for temperature control.

Regardless of the style of knobs and whether each faucet has a single knob associated therewith or multiple knobs, one problem is routinely encountered. A user with soiled hands must first use those soiled hands to grab the control knob of the faucet to turn on the control knob of the faucet and to cause water of a desired temperature to flow at a desired rate out of the faucet. After hands of the user have been thoroughly washed, the same control knob needs to be actuated to turn off the flow of water. The clean hands of the user must thus interact with the control knob which had recently been handled by soiled/dirty hands of the same user. If dirt was to be washed off of hands of the user, some of the dirt ends up on the knob, so that after the hands of the user are cleaned, the user encounters this same dirt residue when turning off the water.

When bacteria/germs, viruses, or other contaminants are to be washed off of hands of a user, those dirty hands interact with the control knob, likely transmitting at least some contaminants to the control knob when turning on the supply of water. After the hands are thoroughly cleaned, they encounter the control knob again, so that the contaminants can make their way back to the hands of a user. Furthermore, future users of the same sink now encounter the contaminants left by the previous user when future users begin the washing process. If they are not sufficiently thorough in washing, contaminates can be transmitted.

The above-identified problem is partially addressed in many prior art solutions, each of which have various drawbacks. As one simple solution, a user can always wash the control knob at the end of the hand washing process. However, human nature predicts that compliance with such a custom, while admirable, is likely to be less than complete. Also, with many contaminants they cannot be seen, so that when a user encounters control knobs of a sink, there is a low level of confidence that prior users have cleaned the control knob(s) when the sink was last used. Cleaning personnel can regularly clean control knobs associated with faucets. However, it is typically impractical to have a cleaning crew clean a faucet between each use thereof.

Some sinks and other washing stations include elaborate and complex controls so that water flow can occur without requiring hands of a user to interact with control knobs. For instance, sinks are known to exist which utilize foot pedals for control of water flow. Some sinks initiate water flow through a motion detector sensing presence of hands or other objects beneath the faucet. Other faucets are configured so that elbows or other portions of the body interact with control knobs, rather than hands of the user. All these solutions can be generally effective, however they involve significant complexity to both manufacture and to install, and their complexity can lead to less reliability in operation. Furthermore, many such systems are limited to a single temperature for the water, so the temperature is less than ideal in many circumstances. Accordingly, a need exists for a solution to the problem of keeping control knobs associated with a faucet from becoming a source of contaminate transmission between individuals, or frustration of the desired contaminate removal process for a single individual, and which can still maintain the benefit of hot and cold temperature mixing and flow rate of the faucet for an optimal faucet utilization experience, especially for hand washing.

SUMMARY OF THE INVENTION

With this invention, a modified control knob is provided which includes a clean grip portion and a dirty grip portion. This modified control knob can be incorporated into the faucet as original equipment, or could be provided as a replacement knob for an existing faucet, or could be in the form of an attachment which attaches to an existing control knob and provides a surface grip structure, having the clean grip portion and the dirty grip portion.

In one embodiment, the modified control knob is in the form of a "V" with an elongate "clean lever" and an elongate "dirty lever" which have roots near each other and free tips which are further from each other than their roots. In use, a user who wishes to turn on water from the faucet first grips the dirty grip and applies forces to the dirty grip which are transferred to the control knob and cause water to flow from the faucet at a desired rate (and also a desired temperature for control knobs which control both flow rate and temperature). The user then washes the user's hands and other items in an ordinary fashion.

Finally, when the water is to be turned off, the user manipulates the clean grip/lever to apply forces onto the control knob causing the water to be turned off. In this way, any contaminants from the user's hands remain on the dirty grip/lever, and the clean grip/lever is only handled after the user's hands are clean. A next user of the faucet or other water supply system first utilizes the dirty grip to turn on water from the faucet. Even if this follow-up user receives contaminants from the dirty grip, the user is immediately cleaning the user's hands, so that any such contamination is only for a moment. Furthermore, periodic cleaning by sanitation personnel or others can occur for both the clean grip and the dirty grip, so that any misuse of the grips can be regularly remedied.

Each of the grips preferably have words or other indicia thereon which designate which grip/lever is "clean" and which grip/lever is "dirty." This indicium thus acts as a visual guide for a user to know which grip to use first and which grip to use second. Indicia could be the words "clean" and "dirty" or could be the words "use first" and "use second" or the words "on" and "off." Research could be performed as to which wording most consistently causes users to properly utilize the clean and dirty controls. Icons could alternatively (or in addition) be utilized, or colors could also potentially be used. The indicia would typically be placed on an upper surface of the grips, but could be placed in other locations.

Clean and dirty grips would be configured to function appropriately with various different faucets including those already in use and those to be created in the future. Because faucets have a wide variety of configurations, such clean and dirty grips would also typically have a wide variety of configurations. Some clean grips and dirty grips can be configured so that they work with multiple different styles and configurations of faucets in a manner which allows the clean grips and dirty grips to be added as accessories to existing faucet control knobs.

A single attachment device including a clean grip and a dirty grip thereon can be provided for use on faucet control knobs which simultaneously control both flow rate and temperature. For faucets with separate hot and cold control knobs, two separate attachment devices can be provided, one for the hot control knob and one for the cold control knob. Each of these attachment devices would have a clean grip portion and a dirty grip portion. Thus, for some faucets there will be two clean grip controls and two dirty grip controls, one for the hot control knob and one for the cold control knob.

In one embodiment, when this invention is configured as an attachment for a control knob, a base portion can be provided with a hollow core that is open at an end thereof. The opening can be sized similar to a size of one or more different control knob tips. The control knob tip can be placed within such an opening. Interior surfaces can be sized to closely match the tip of the control knob or can be configured with a resilient structure, preferably with a relatively high coefficient of friction, so that a friction fit can be provided when the tip of the control knob is placed within the hollow bore within the cover structure at the base of the attachment device. This cover structure also includes a clean grip/lever extending therefrom to a tip and a dirty grip/lever extending therefrom to a tip.

The extensions can be in the form of a V, with each leg of the V being an elongate lever/grip (one "clean" and one "dirty"). The levers can extend linearly or non-linearly, such as with one or more curves in each lever, or can have some other configuration spacing the dirty grip/lever and the clean grip/lever sufficiently (e.g. at least one inch apart at free tips thereof) so that when the dirty grip is handled, contamination does not transfer over to the clean grip, and so that the clean grip can be manipulated with clean hands and without coming into contact with the dirty grip. Grips with an "H" configuration, an "S" configuration or a variety of other configurations could also be provided.

OBJECTS OF THE INVENTION

Accordingly, a primary object of the present invention is to provide separate clean and dirty faucet control elements so that these faucet control elements can be handled by a user with corresponding clean or dirty hands, to keep the clean faucet control elements in a clean state.

Another object of the present invention is to provide faucet control levers which are attachable to an existing faucet control knob assembly, and with the faucet control levers including a lever designated as clean and a lever designated as dirty.

Another object of the present invention is to provide a faucet which has control levers integrated thereinto which include a lever designated as clean and a lever designated as dirty.

Another object of the present invention is to provide a kit which allows for modification of an existing faucet by addition or replacement of control levers so that the faucet has control levers including a lever designated as clean and a lever designated as dirty.

Another object of the present invention is to reduce potential for transmission of contaminants from an earlier faucet user to a later faucet user.

Another object of the present invention is to reduce potential for transmission of contaminants from a faucet user back to the same faucet user.

Another object of the present invention is to provide a system for more effectively washing hands of a user.

Another object of the present invention is to provide a retrofit kit which can be attached to an existing faucet and provide separate clean and dirty levers for actuation of controls of the existing faucet.

Another object of the present invention is to provide a retrofit kit which can be attached to multiple different types of existing faucets having different configurations, with the retrofit kit providing separate clean and dirty levers for actuation of controls of the existing faucet.

Another object of the present invention is to provide a simple tool attachable to a faucet to allow for control of a faucet in a manner which reduces or eliminates potential for transmission of contaminants to hands of a user of the faucet.

Another object of the present invention is to provide a faucet with a control knob having two separate levers which can each control the faucet flow rate and/or temperature, and with indicia on the levers to distinguish them from each other and to instruct as to sequence of lever use to keep contaminants off of at least one of the levers.

Other further objects of the present invention will become apparent from a careful reading of the included drawing figures, the claims and detailed description of the invention.

BRIEF DESCRIPTION OF THE DRAWINGS

FIG. 1 is a perspective view mostly from a rear position behind a faucet featuring clean and dirty controls according to one embodiment of this invention.

FIG. 2 is a perspective view mostly from a left side, of that which is shown in FIG. 1.

FIG. 3 is a perspective view of that which is shown in FIG. 1, as seen primarily from a front side.

FIG. 4 is a perspective view of that which is shown in FIG. 1, as seen primarily from above.

FIG. 5 is a side elevation view of an alternative embodiment of that which is shown in FIG. 1, featuring clean and dirty controls as part of an attachment structure which can be removably attached to a control knob of a faucet.

FIG. 6 is a rear elevation view of the attachment structure which is shown in FIG. 5, and shown without the faucet control knob to which it attaches.

FIG. 7 is a left side elevation view of that which is shown in FIG. 6.

FIG. 8 is a top plan view of that which is shown in FIG. 6.

DESCRIPTION OF THE PREFERRED EMBODIMENT

Referring to the drawings, wherein like reference numerals represent like parts throughout the various drawing figures, reference numeral 10 is directed to a faucet which has a control knob assembly 20 featuring unique details of this invention integrated thereinto (FIGS. 1-4). This first embodiment is one example of this invention when integrated into a faucet. In a second embodiment (FIGS. 5-8) a variation of this invention is depicted which is removably attachable as an accessory to an existing faucet, to provide similar function according to this invention. With this invention, grippable portions are provided for controlling the faucet which can be handled separately from each other, so that dirty hands can handle a first portion to turn on the faucet and clean hands can handle a second portion to turn off the faucet, and avoid clean hands needing to contact potentially dirty control surfaces.

In essence, and with a particular reference to FIGS. 1-4, basic details of this invention are described according to a first embodiment. The faucet 10 includes a control knob assembly 20 which is coupled to a valve of the faucet 10 for control of water flow therethrough (and potentially also temperature control). The control knob assembly 20 generally includes a base 30 with a shaft 40 movable relative to the base 30 to actuate the valve of the faucet 10. A junction 50 is coupled to the shaft 40 (or otherwise coupled to the valve through intervening structures in various different embodiments to accommodate different faucet designs). A clean lever 60 extends from the junction 50. A dirty lever 70 also extends from the junction 50, with the dirty lever 70 spaced from the clean lever 60 sufficiently so that these levers 60, 70 can be handled separately, with either lever 60, 70 able to transfer forces appropriately to the valve of the faucet 10 through the junction 50, to allow for control of the valve of the faucet 10. In a second embodiment (FIGS. 5-8) a faucet 100 is fitted with a removably attachable attachment 110 having a receiver 120 thereon which can be coupled to a control knob 104 of the faucet 100. This receiver 120 supports a junction 150 which includes a dirty lever 160 and a clean lever 170 so that when the attachment 110 is attached to the faucet 100, the attributes of this invention can be retrofitted onto the existing faucet 100.

More specifically, and with particular reference to FIGS. 1-4, basic details of the faucet 10 are described according to one example embodiment. The faucet 10 in this one example embodiment is an outlet for water or other fluids which also incorporates a valve to control flow out of the faucet 10, including initiating and stopping flow, as well as controlling an amount of flow. In many embodiments, the faucet 10 can also control temperature.

As shown herein, the faucet 10 is adjacent to a basin 2, such as a basin 2 mounted within a countertop 4 of general horizontal planar form. The faucet 10 is mounted upon a foundation 6 resting upon the countertop 4. A riser 12 extends up from the foundation 6. The riser 12 also supports a spout 14 from which water or other fluids exit the faucet 10. Typically, the spout 14 extends out over the basin 2, so that water or other fluids exiting the spout 14 of the faucet 10 fall down into the basin 2.

The faucet 10 includes the control knob assembly 20 which interacts with a valve within an interior of the faucet 10. Generally the valve of the faucet 10 is an internal structure which has a water line upon which the valve is located. This water line (or other fluid line) feeds water to the spout 14 when the valve is at least partially open, and blocks such flow when the valve is closed. The valve can be any of a variety of different types of valves including ball valves, gate valves, stopcock type valves, and any other variety of other different types of valves.

The control knob assembly 20 can be of a type which rotates, pivots, pushes, or otherwise moves either in a linear translating fashion or in a curving rotational fashion, which movement causes the valve to transition from a closed state to an open state, and also intermediate flow control states. Manual controls of some type are associated with the control knob assembly 20 so that hands of a user can interact with the control knob assembly 20 to move it appropriately to cause a state of the valve within the faucet 10 to match a desired state for the valve (e.g. opening the valve for fluid flow, closing the valve to stop fluid flow, or an intermediate position where an amount of flow is controlled, as well as optionally also temperature control). In at least one embodiment, the control knob assembly 20 has at least two degrees of freedom with one degree of freedom controlling the state of the valve as being open, closed or at some intermediate flow control state, and a second degree of freedom controlling temperature between fully cold, fully hot or some intermediate temperature between these extremes. Typically when the valve of the faucet 10 includes temperature control, at least two water lines lead to the valve, including a hot water line and a cold water line, and mixing of flow from these hot and cold lines results in a desired temperature exiting the faucet 10 through the spout 14.

Typically, the control knob assembly 20 interacts with the valve of the faucet 10 through mechanical connection therebetween. However, it is conceivable that other forms of connection and coupling, either directly or through intervening structures, could instead (or in addition) include electrical connection (such as utilizing solenoids or linear or rotational displacement transducers), or utilizing a magnetic coupling, or a hydraulic or pneumatic actuator, as alternatives to a purely mechanical interconnection between the control knob assembly 20 and the valve of the faucet 10.

In the particular embodiment for the faucet 10 depicted herein, the control knob assembly 20 includes a base 30 mounted upon the riser 12. This base 30 includes a lower end 32 opposite an upper end 34, with the lower end 32 coupled to the riser 12. A shaft 40 extends up out of the upper end 34 of the base 30. Either the base 30 and/or the shaft 40 exhibit movement relative to the riser 12, and functions as the control knob assembly 20 in this example embodiment. Such movement in this embodiment includes tilting about an X-axis (FIG. 3), along arrow A to cause water flow along arrow C (FIG. 2) for flow control, and pivoting (along arrow B) about a Y-axis (FIG. 3) to adjust temperature control. In other embodiments, other forms of rotation or translation (such as rotation about axis Z (FIG. 3) could additionally or alternatively be utilized either for flow control or for temperature control. In other embodiments, the faucet 10 can be plumbed with only one temperature of water and a single degree of freedom could be provided for turning the water on or off. In some embodiments, two separate faucets are provided with separate spouts 14 over a common basin 2, with one faucet 10 providing cold water and one faucet 10 providing hot water, as an acceptable alternative. In such a case, each faucet 10 could be modified according to this invention.

Uniquely with this invention, the control knob assembly is fitted with a grip (also referred to as a control or a manual control or manual interface) which includes a junction 50 coupled to the shaft 40 which group includes a clean lever 60 (also called a first portion) separate from a dirty lever 70 (also called a second portion). The grip defines that portion of the control knob assembly 20 which is configured to be handled by hands of a user during operation of the faucet 10 and to control a status of the faucet 10, such as "on" or "off" flow from the faucet 10 and/or an amount of flow from the faucet 10.

The junction 50 defines a portion of the grip where the clean lever 60 and dirty lever 70 come together. In a simplest embodiment, the junction 50 merely defines a portion of the manual interface where the two levers 60, 70 come together. Most preferably, the junction 50, clean lever 60 and dirty lever 70 are all formed to be rigidly coupled together and so that movement of any one portion of the junction 50, clean lever 60 and/or dirty lever 70 causes other portions of this assembly of a junction 50, clean lever 60 and dirty lever 70 to move together. Thus, for instance, if the clean lever 60 is gripped and pivoted upward (about arrow A of FIG. 2) the junction 50 also pivots about arrow X (as well as the dirty lever 70). Correspondingly, if the dirty lever 70 is gripped and pivoted upward (about arrow A of FIG. 2) junction 50 correspondingly pivots about arrow X (as well as the clean lever 60). In this way, the control knob assembly 20 and the associated valve of the faucet 10 can be controlled either through manual input of forces to the clean lever 60 or to the dirty lever 70.

The clean lever 60 has an elongate form extending from a root 62 to a tip 64 opposite the root 62. Similarly, the dirty lever 70 has an elongate form extending from a root 72 to a tip 74 opposite the root 72. The roots 62, 72 of the levers 60, 70 are each adjacent to the junction 50. In one embodiment, these roots 62, 72 are also adjacent to each other. The tips 64, 74 of the levers 60, 70 are spaced from each other. This spacing is sufficient so that at least portions of the clean lever 60 can be handled by hands of a user without contacting any portions of the dirty lever 70, and at least portions of the dirty lever 70 can be manually handled by a hand of a user while not touching the clean lever 60. In one embodiment, spacing between the tips 64, 74 is at least about one inch. In one embodiment, the elongate form of the levers 60, 70 is linear extending from the roots 62, 72 to the tips 64, 74. The two levers 60, 70 could extend parallel with each other or diverge from each other. In one embodiment, when viewed from above, the two level 60, 70 have a general form of a "V".

The clean lever 60 includes an indicium 66 which can be perceived, such as visually, and distinguished from the dirty lever 70. The dirty lever 70 includes an indicium 76 which can be perceived, such as visually, and distinguished from the dirty level 60. In one embodiment, the indicium 66 has the word "clean" printed on an upper surface or some other surface of the clean lever 60. Other options for the indicium 66 include the word "off" or the word "last" or the word "finish" or "end." Correspondingly, the indicium 76 on the dirty lever 70 in one embodiment has the word "dirty" printed on an upper surface or some other surface of the dirty lever 70. Other options for the indicium 76 includes the word "on" or the word "first" or the word "start" or "begin." Note that the levers 60, 70 and/or indicia 66, 76 could be swapped and still function effectively according to this invention.

While the clean lever 60 and dirty lever 70 (also called a first lever and a second lever or vice versa) are described above with regard to the particular embodiment faucet 10 and control knob assembly 20 disclosed in FIGS. 1-4, the levers 60, 70 can be appropriately adapted to attach to other forms of faucets and control knob assemblies as well. At a minimum, the levers 60, 70 are attached in some fashion to some form of control knob assembly of some form of faucet so that the control knob assembly can be actuated to control a valve of the faucet through manipulation of either the clean lever 60 or the dirty lever 70. In use and operation, a user would first use the dirty lever 70 to turn on the faucet (and optionally also select a desired temperature). The user then wash the user's hands in the traditional fashion. Finally, a user would manually engage the clean lever 60 to turn off the faucet. Note that clean hands of the user never engage the clean lever 60. Thus, any contaminants transferred from hands of the user (or a previous user) to the dirty lever 70 remain on the dirty lever 70, and are not transferred to clean hands of the user after hand washing, because the faucet is turned off by only engaging the clean lever 60. The clean lever 60 is never engaged by dirty hands of any prior users or the current user, so that the clean lever 60 can remain substantially free of contaminants. Periodic washing of both levers 60, 70, such as by cleaning personnel, can overcome any misuse of the levers 60, 70 by prior users.

As other alternative configurations of the levers (also called "grips"), options include an "H" or an "S" shape. For instance, the "dirty" lever could be a left upright of the "H" and a "clean" lever could be a right upright of the "H" and with a separator bar between the two levers. The levers can be parallel or perhaps up to 30° away from parallel. For an "S" shape grip (or "Z" or other shape without a separator bar), one end would be the "dirty" lever and one end would be the "clean" lever, with corresponding indicia.

With particular reference to FIGS. 5-8, details of the faucet 100 and attachment 110 are described, according to this alternative example embodiment. The attachment 110 is designed to be removably attachable to the faucet 100, rather than being built into the faucet 100 as original equipment. As one example, the faucet 100 includes a foundation 102 with a control knob 104 preferably attached to a riser 106 extending up from the foundation 102. The spout 108 also extends from the riser 106 and supports discharge of water or other fluids therefrom when the valve of the faucet 100 is in an open state. Temperature control can also be provided with such a faucet, as described in detail above.

A distal end of the control knob 104 is coupled to the attachment 110 in this embodiment. In particular, the attachment 110 includes a receiver 120 into which the distal end of the control knob 104 can be securely but removably placed. The receiver 120 includes an entry 122 in the form of a blind bore 124 extending into the receiver 120 of the attachment 110. Inner walls 126 of this bore 124 are preferably formed of a resilient material which can be compressed somewhat by the distal end of the control knob 104. A size of the bore 124 and associated inner walls 126 are such that dimensions are smaller than at the distal end of the control knob 104. Thus, this resilient inner wall 126 material must be compressed somewhat so that the distal end of the control knob 104 can fit into the bore 124. Such a friction fit between the distal end over the control knob 104 and the inner walls 126 of the bore 124, causes the attachment 110 to be securely held to the distal end on the control knob 104.

In one embodiment, the inner wall 126 material of the bore 124 is sufficiently thick and sufficiently resilient that distal ends of control knobs 104 of different sized faucets 100 can be accommodated with a single size of bore 124 inner walls 126 of a single receiver 120. In other embodiments, the attachment 110 can be provided with different size, shapes and dimensions for receivers 120 to at least approximately match sizes, shapes and dimensions of different distal ends of different control knobs 104 of different faucets 100. In this way, a set of different attachments 110 are initially provided and an attachment 110 is selected which is appropriately sized, shaped and/or dimensioned so that it can fit securely to an existing faucet 100 at the distal end of the control knob 104. Such an arrangement allows for retrofitting of attachments 110 onto existing faucets 100 to provide the benefits of this invention.

The receiver 120 is provided at one end of a junction 150. This junction 150 supports a dirty lever 160 and a clean lever 170. The dirty lever 160 and clean lever 170 are similar to the corresponding levers 60, 70 described in detail above with respect to the faucet 10 of the first disclosed embodiment. In particular, the dirty lever 160 includes a root 162 opposite a tip 164 and with an appropriate indicium 166 thereon. The clean lever 170 includes a root 172 opposite a tip 174 and with an appropriate indicium 176 visible thereon. Function of the attachment 110 and faucet 100 in this second embodiment of FIGS. 5-8 is similar to that disclosed above with respect to the faucet 10, after the attachment 110 has been securely placed upon the distal end of the controller 104 of the faucet 100.

As an alternative to the bore 124 and associated inner walls 126 of resilient material to attach the attachment 110 to the faucet 100, other forms of connections could be provided, including set screws or other adjustable hardware, elastic bands, laces, ties, and other forms of connectors.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A faucet, comprising in combination:
a water flow control valve;
a control knob coupled to the control valve such that manipulation of the control knob adjusts flow of water through the control valve;
a grip on said control knob, said grip including two separate portions including a first portion and a second portion, said first portion grippable to allow manual adjustment of said control knob without manual contact with said second portion, and said second portion grippable to allow manual adjustment of said control knob without manual contact with said first portion; and
wherein said grip is removably attachable to said control knob.

2. The faucet of claim 1 wherein said first portion of said grip is an elongate structure extending from a first root and said second portion of said grip is an elongate structure extending from a second root.

3. The faucet of claim 2 wherein said first root of said first portion and said second root of said second portion are located closer to each other than ends of said first portion and said second portion opposite said first root of said first portion and said second root of said second portion.

4. The faucet of claim 3 wherein said first portion and said second portion include distinct indicia thereon, which can be visibly seen to distinguish said first portion from said second portion.

5. The faucet of claim 3 wherein said first portion and said second portion each extend parallel to each other and spaced apart with a separator bar between said grip having a form of an "H".

6. The faucet of claim 5 wherein said distinct indicia includes words visible on exterior surfaces of said first portion and said second portion.

7. The faucet of claim 6 wherein said distinct indicia include the word "dirty" and the word "clean".

8. The faucet of claim 6 wherein said distinct indicia include the word "on" and the word "off".

9. The faucet of claim 1 wherein said grip includes a receiver with a bore therein, and with at least a portion of said control knob fitting within said bore for attachment of said grip to said control knob.

10. The faucet of claim 1 wherein said first root and said second root are joined together through said receiver and a portion of said receiver spaced from an entry into said bore.

11. The faucet of claim 10 wherein said first portion and said second portion extend linearly from said roots to exhibit a "V" shape.

12. A manual control for actuation of a faucet, the manual control comprising in combination:
a junction coupleable to a valve of the faucet;
a first elongate lever fixed to said junction at a first root of said first elongate lever and extending away from said junction to a first tip of said first elongate lever opposite said first root of said first elongate lever;
a second elongate lever fixed to said junction at a second root of said second elongate lever and extending away from said junction to a second tip of said second elongate lever opposite said second root of said second elongate lever;
said first tip of said first elongate lever spaced from said second tip of said second elongate lever such that said first tip can be manually engaged without contacting said second elongate lever; and
wherein said junction is removably attachable to a control knob of the faucet, which control knob is coupled to the valve of the faucet to control at least flow of fluid from said faucet.

13. The manual control of claim 12 wherein said junction includes a receiver with a bore therein, said bore sized to receive at least a portion of the control knob therein.

14. The manual control of claim 13 wherein at least a portion of a surface of said bore includes a resilient liner sized smaller than a portion of the control knob, such that a portion of the control knob can compress said resilient liner and exhibit a friction fit securely held within said bore of said receiver.

15. The manual control of claim 12 wherein indicia are provided on at least one of said first elongate lever and said second elongate lever, said indicia allowing a user to perceive a distinction between said first elongate lever and said second elongate lever.

16. The manual control of claim 15 wherein said indicia includes a first indicium located on said first elongate lever and a second indicium located upon said second elongate lever, said first indicium distinct from said second indicium, each of said indicia visually perceptible by a user.

17. The manual control of claim 16 wherein said first indicium includes the word "dirty" and said second indicium includes the word "clean".

18. The manual control of claim 16 wherein said first indicium includes the word "on" and said second indicium includes the word "off".

19. The manual control of claim 16 wherein said first indicium includes a word or symbol which indicates that said first elongate control lever should be used first, and said second indicium includes a word or symbol which indicates that said second elongate control lever should be used last.

* * * * *